DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 452

T905,001

HEAT-SHRINKABLE PLASTIC FILMS

Bruce Frederick Day, Wilmington, Del., assignor to E. I. du Pont de Nemours and Company, Wilmington, Del.

Continuation of abandoned application Ser. No. 8,066, Feb. 2, 1970. This application Aug. 13, 1971, Ser. No. 171,777

Int. Cl. B65b *53/02*

U.S. Cl. 264—25

No Drawing. 5 Pages Specification

An improvement in heat shrinking plastic films for use on packages, e.g., stacks of articles on large pallets, wherein the film is made completely or partially conductive and is heated by causing current to flow therein. The film can be coated or filled with conductors or semi-conductors. The current can be caused to flow in the film between electrodes or induced to flow in eddy currents by induction.

Films disclosed are PVC and heat shrinkable polyethylene. The films can be rendered conductive by metallizing the surface or by adding fillers such as carbon, powdered metals such as iron, aluminum, zinc, magnesium, and chromium, semi-conductive fillers such as zinc oxide, tin oxide or chromium oxide or metal carbides and nitrides.